United States Patent
Gupta et al.

(10) Patent No.: US 11,743,906 B2
(45) Date of Patent: Aug. 29, 2023

(54) DYNAMIC BASE STATION CONTROL FOR WIRELESS CONTROLLER

(71) Applicant: QUALCOMM Incorporated, San Diego, CA (US)

(72) Inventors: Piyush Gupta, Bridgewater, NJ (US); Hua Wang, Basking Ridge, NJ (US); Junyi Li, Franklin Park, NJ (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 17/160,126

(22) Filed: Jan. 27, 2021

(65) Prior Publication Data

US 2021/0258927 A1 Aug. 19, 2021

Related U.S. Application Data

(60) Provisional application No. 62/976,506, filed on Feb. 14, 2020.

(51) Int. Cl.
*H04L 1/18* (2023.01)
*H04W 72/23* (2023.01)
(Continued)

(52) U.S. Cl.
CPC .......... *H04W 72/23* (2023.01); *H04L 1/1887* (2013.01); *H04L 5/0055* (2013.01); *H04W 72/0446* (2013.01); *H04W 72/21* (2023.01)

(58) Field of Classification Search
CPC . H04W 72/23; H04W 72/0446; H04W 72/21; H04L 1/1887; H04L 5/0055
See application file for complete search history.

(56) References Cited

U.S. PATENT DOCUMENTS

| 6,697,627 | B1 * | 2/2004 | Ueno | ................ | H04W 36/0061 |
| | | | | | 455/438 |
| 2019/0313433 | A1 * | 10/2019 | Abedini | ............ | H04W 72/0446 |

(Continued)

FOREIGN PATENT DOCUMENTS

| WO | WO-2019105564 A1 * | 6/2019 | ............... H04L 5/14 |
| WO | WO-2020007244 A1 | 1/2020 | |

OTHER PUBLICATIONS

Anonymous: "3rd Generation Partnership Project, Technical Specification Group Radio Access Network, NR, Study on Integrated Access and Backhaul, (Release 16)", 3GPP Standard Technical Report, 3GPP, TR 38.874, 3rd Generation Partnership Project (3GPP), Mobile Competence Centre, 650, Route Des Lucioles, F-06921 Sophia-Antipolis Cedex, France, No. V16.0.0, Dec. 31, 2018 (Dec. 31, 2018), pp. 1-111, XP051591643, Sections 8.3.5 and 9.3, p. 21-p. 23.

(Continued)

*Primary Examiner* — Brenda H Pham
(74) *Attorney, Agent, or Firm* — Holland & Hart/Qualcomm

(57) ABSTRACT

Methods, systems, and devices for wireless communication are described. In a system with high reliability and low latency targets, base station control can be dynamically configured. In some systems, a semi-static split with a greater duration for communications between a controller and one or more associated sensor/actuators than a duration for communications between the controller and base station can be used. In some embodiments, an interrupt can be used to allow for base station control.

28 Claims, 13 Drawing Sheets

(51) Int. Cl.
  *H04L 1/1867* (2023.01)
  *H04L 5/00* (2006.01)
  *H04W 72/0446* (2023.01)
  *H04W 72/21* (2023.01)

(56) References Cited

U.S. PATENT DOCUMENTS

2019/0357117 A1* 11/2019 Cudak .................. H04W 80/02
2022/0060277 A1*  2/2022 Wei ...................... H04L 5/0094

OTHER PUBLICATIONS

Intel Corporation: "Resource Allocation for NR IAB", 3GPP Draft, 3GPP TSG RAN WG1 Ad-Hoc Meeting 1901, R1-1900478, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593391,5 Pages, Retrieved from the Internet: URL:http://www.3gpp.org/ftp/Meetings%5F3GPP%5FSYNC/RAN1/Docs/R1%2D1900478%2Ezip [retrieved on Jan. 20, 2019] Paragraph [0001]-Paragraph [0002], sections 2 and 3.
International Search Report and Written Opinion—PCT/US2021/015681—ISA/EPO—dated Jul. 9, 2021.

* cited by examiner

DYNAMIC BASE STATION CONTROL FOR WIRELESS CONTROLLER

CROSS-REFERENCE

The present Application for Patent claims the benefit of U.S. Provisional Patent Application No. 62/976,506 by GUPTA et al., entitled "DYNAMIC BASE STATION CONTROL FOR WIRELESS CONTROLLER," filed Feb. 14, 2020, assigned to the assignee hereof, and expressly incorporated by reference herein.

BACKGROUND

The following relates generally to wireless communication, and more specifically to wireless control low latency use cases.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard.

Emerging wireless communication techniques such as URLLC can provide a reliable framework for Industrial Internet of Things (IIoT) applications requiring high reliability and low latency. IIoT applications include factory automation applications, laboratory applications, and other commercial, academic, or government applications using complex automation.

SUMMARY

Methods, systems, and devices for wireless communication are described. In general, in one aspect, a controller such as a programmable logic controller includes memory circuitry and processor circuitry configured to store information such as data and instructions to perform the actions of the disclosed methods. The controller further includes transceiver circuitry to transmit and receive signals according to the disclosed methods.

In general, in one aspect, a method of wireless communication of a controller includes receiving configuration information for interrupt resources from a base station. The interrupt resources include time resources included in a time interval for communications between the controller and one or more associated Sensor/Actuators (S/As). In some aspects, the controller processes interrupt information received using the interrupt resources to determine a switch time, wherein the switch time is a time to switch from communications between the controller and the one or more S/As to communications between the controller and the base station.

In some aspects, the interrupt information includes priority information, the priority information indicating a priority for switching to communications between the controller and the base station. The method may include processing the interrupt information to determine the priority information, and determining whether to switch to communications between the controller and the base station at the switch time or to continue communicating with the one or more associated S/As. In some cases, the method may include transmitting an acknowledgement to the base station in response to processing the interrupt information and determining to switch to communications between the controller and the base station at the switch time, or transmitting a negative acknowledgement (NACK) to the base station in response to processing the interrupt information and determining not to switch to communications between the controller and the base station at the switch time.

In some aspects, the method may include processing the interrupt information to determine an offset indicating a wait time before the switch time. The controller may process the interrupt information to determine an implicitly indicated offset or an explicitly indicated offset. The offset may indicate a particular slot, mini-slot, symbol, or subframe in which the switch time is included.

In some aspects, receiving configuration information for interrupt resources from the base station may include receiving an indication of one or more physical downlink control channel (PDCCH) monitoring occasions. In some aspects, receiving configuration information for interrupt resources from a base station may include receiving physical uplink control channel (PUCCH) signaling from the base station, physical uplink shared channel (PUSCH) signaling from the base station, or both. In some aspects, receiving configuration information for interrupt resources from a base station comprises receiving broadcast signaling including at least some configuration for interrupt resources from the base station. In some aspects, the interrupt resources may be periodic.

In some aspects, in the absence of interrupt information from the base station indicating a switch time, the controller may be configured to switch between communications with the base station and communications with the one or more S/As using a semi-static split. The semi-static split may comprise a recurring set of time resources including a first duration during which the controller communicates with the base station and a second duration during which the controller communicates with the one or more S/As, wherein the second duration is greater than the first duration. The time resources included in the time interval for communications between the controller and one or more associated S/As may comprise time resources included in the second duration.

The second duration can include a plurality of cyclic communications between the controller and the one or more associated S/As. The plurality of cyclic communications between the controller and the one or more associated S/As each include a downlink-centric portion and an uplink-centric portion. In some cases, the downlink-centric portion includes a first set of semi-statically configured transmissions from the controller to the one or more associated S/As, wherein a transmission from the controller to each of the one or more associated S/As uses different frequency resources.

The downlink-centric portion can further include at least one acknowledgement/negative acknowledgement (ACK/NACK) symbol, wherein the controller receives an ACK or a NACK from each of the one or more associated S/As during the at least one ACK/NACK symbol. In response to receiving at least one NACK in the at least one ACK/NACK symbol, the controller may transmit a PDCCH including scheduling information for retransmission for each of the one or more associated S/As that transmitted a NACK.

In general, in another aspect, a base station and associated methods are disclosed. The base station includes memory circuitry and processor circuitry configured to store information such as data and instructions to perform the actions of the disclosed methods. The base station further includes transceiver circuitry to transmit and receive signals according to the disclosed methods.

In general, in one aspect a method of wireless communication at a base station includes transmitting configuration information for interrupt resources to a controller. The interrupt resources may include time resources included in a time interval for communications between the controller and one or more associated Sensor/Actuators (S/As). The method may further include transmitting interrupt information using the interrupt resources. The interrupt information can include information indicative of a switch time, wherein the switch time is a time to switch from communications between the controller and the one or more S/As to communications between the controller and the base station.

In some cases, the interrupt information can include priority information, the priority information indicating a priority for switching to communications between the controller and the base station. The method may further include receiving an acknowledgement from the controller indicating the controller will switch to communications between the controller and the base station at the switch time, or receiving a negative acknowledgement (NACK) from the controller indicating the controller will not switch to communications between the controller and the base station at the switch time.

In some aspects, the interrupt information includes an offset, the offset indicating a wait time before the switch time. The offset can indicate a particular slot, mini-slot, symbol, or subframe, wherein the switch time is included in the particular slot, mini-slot, symbol, or subframe.

In some aspects, the configuration information for interrupt resources comprises an indication of one or more physical downlink control channel (PDCCH) monitoring occasions for the controller to monitor for interrupt information. In some aspects, transmitting configuration information for interrupt resources comprises transmitting configuration information using physical uplink control channel (PUCCH) signaling, physical uplink shared channel (PUSCH) signaling, or both. In some aspects, transmitting configuration information for interrupt resources comprises transmitting broadcast signaling including at least some configuration for interrupt resources. The interrupt resources may be periodic. In some aspects, the base station is configured to communicate with the controller using a semi-static switch in the absence of an interrupt.

In general, in another aspect, a sensor/actuator and associated methods are disclosed. The sensor/actuator includes memory circuitry and processor circuitry configured to store information such as data and instructions to perform the actions of the disclosed methods. The sensor/actuator further includes transceiver circuitry to transmit and receive signals according to the disclosed methods.

In general, in one aspect, the sensor/actuator performs a method comprising communicating with a controller according to a semi-static split, the semi-static split comprising a recurring set of time resources including a first duration and a second duration greater than the first duration. In some aspects, the second duration includes a plurality of cyclic communications between the controller and the sensor/actuator. Communicating with the controller according to the semi-static split comprises communicating with the controller during the second duration and not communicating with the controller during the first duration. The method may further include receiving an indication from the controller that an interrupt is scheduled during a second duration of a particular set of the recurring set of time resources, and refraining from communicating with the controller during the scheduled interrupt. In some aspects, communicating with the controller comprises communicating with the controller using a Uu interface.

DETAILED DESCRIPTION

Emerging wireless communication systems and techniques such as 5G (NR) URLLC (Ultra-Reliable Low Latency Communications) techniques can enable applications with stringent latency and reliability requirements. In some examples of IIoT systems, maximum latency targets on the order of 1-2 ms and reliability targets on the order of $10^{-5}$ to $10^{-6}$ are common, with some systems targeting even lower latency and/or higher reliability. Both control and data channels typically have stringent reliability targets in current IIoT systems.

Traffic for some factory automation and other IIoT systems is deterministic and periodic. Controllers such as programmable logic controllers (PLCs) and one or more associated devices such as sensors/actuators (S/As) use cyclic communications to perform system actions, such as executing commands to make measurements and perform measurement-related algorithms, perform a movement algorithm, perform a status-related algorithm, perform a calibration-related algorithm, change a temperature or other environmental factor (e.g. turn on a heating element, perform a pressure adjustment, or adjust filtering), perform quality measurements on work in progress (WIP), etc. Base stations such as eNBs, gNBs, or other base station apparatus communicate with PLCs and S/As to provide overall system control and to interface with other network apparatus such as core network apparatus. In an IIoT environment, the S/As include communication circuitry to receive and execute commands and to receive and transmit data, and also interface with factory or laboratory equipment, measurement equipment, etc. S/As may be integrated with the equipment or may be a separate device to control interface with one or more pieces of equipment.

In some previous IIoT systems, base station functionality and controller functionality were incorporated into a single device, or the base station and one or more PLCs were co-located devices that used wired connections. However, locating the PLCs closer to their associated S/As can allow for more reliable PLC-S/A communication, while locating the base station somewhere with a relatively un-obstructed transmission pathway to the controllers and to external network apparatus (in the case of a wireless connection to the network) enhances the reliability of those communications.

Figure 1:
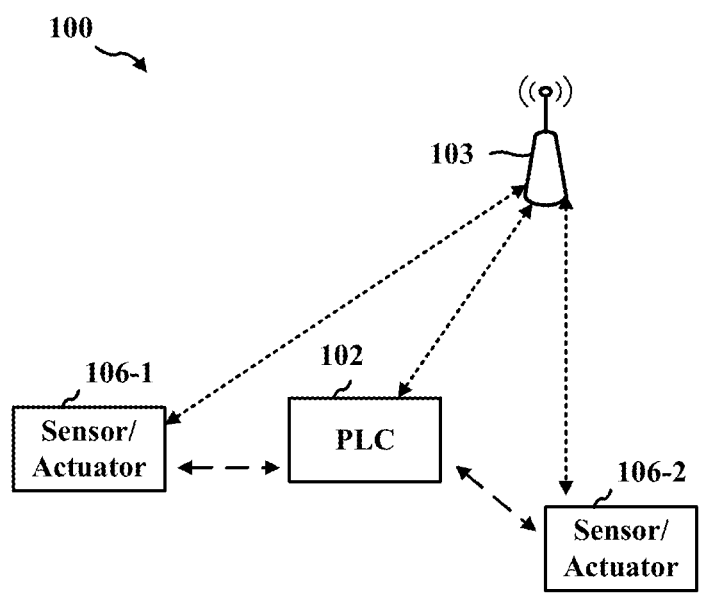
FIG. 1 illustrates an example of a wireless communication system according to the prior art.

Therefore, controllers and base stations are sometimes positioned in separate locations and are configured to communicate wirelessly. FIG. 1 illustrates an example communication system 100 including a PLC 102 and two associated S/As 106-1 and 106-2, according to the prior art. PLC 102 communicates wirelessly with S/As 106-1 and 106-2 and with a base station (gNB) 103, while S/As 106-1 and 106-2 communicate wirelessly with their particular PLC 102 and with gNB 103. In this system, gNB 103 provides the control, so (for example) if a PLC 102 wants to transmit control information to S/A 106-1, it first transmits to gNB 103, which transmits the control information to S/A 106-1. In another example, if S/As 160 do not successfully receive a transmission from their associated PLC 102, information regarding the failure needs to be transmitted to gNB 103, which determines whether and how to reallocate resources among the PLCs 102 and then transmits configuration information to the PLCs 102 and S/As 106. Since multiple hops are used to communicate control information, the latency requirements for each of the transmissions can be difficult to meet.

Figure 2A:
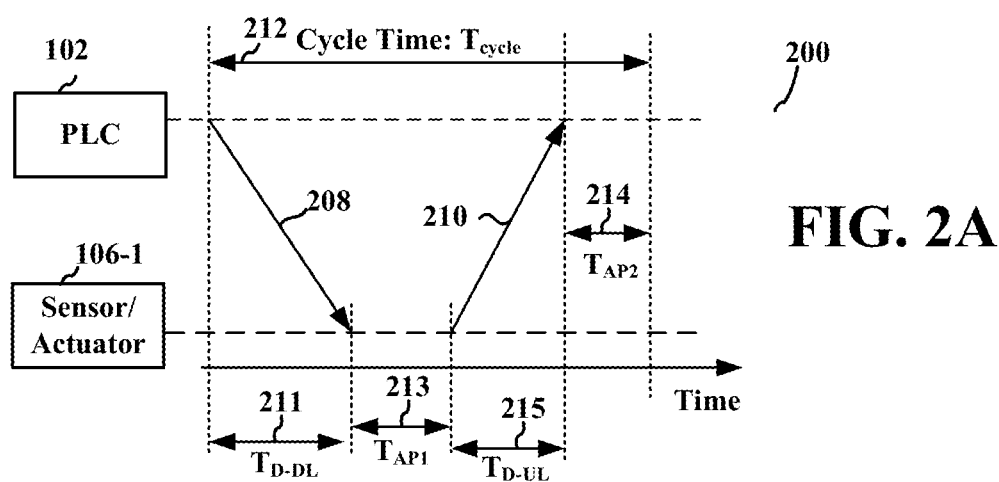
FIG. 2A illustrates an example of a communication cycle between a controller and a sensor/actuator.

As noted above, communications between PLCs and their associated S/A(s) can be deterministic and periodic. FIG. 2A shows a timing diagram for example cyclic communications in a system such as system 100 of FIG. 1. FIG. 2A shows the communications between one PLC 102 and one S/A 106-1, and does not show communications between a base station such as gNB 103 and PLCs 102, or communications between gNB 103 and the S/As 106.

FIG. 2A shows a first communication cycle 200 of a plurality of communication cycles between a controller PLC 102 and one of its associated UEs, S/A 106-1, where cycle 200 has a cycle time 212 denoted as $T_{cycle}$. In FIG. 2A, the x-axis shows time, and the y axis illustrates the transmissions between PLC 102 and S/A 106-1. Other S/As 106 can also communicate with the same associated PLC 102 (or with other PLCs) during the illustrated cycle time 212 using different frequency resources.

Figure 2B:
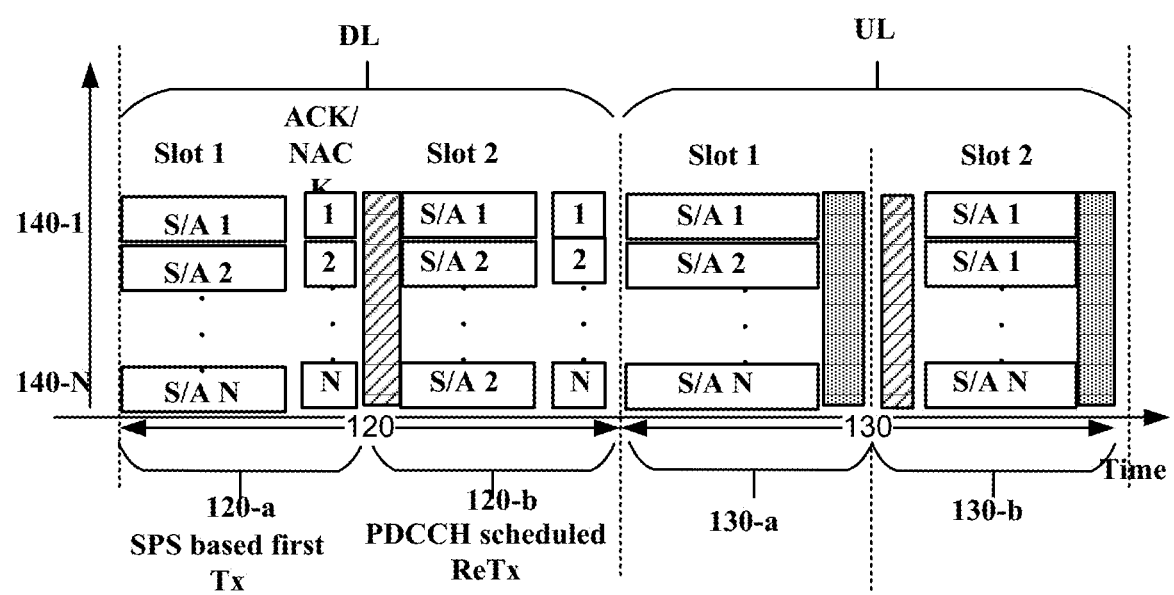
FIG. 2B illustrates an example of a communication cycle including two downlink-centric slots and two uplink-centric slots.

In the example shown in FIG. 2A, the first portion of the cycle is referred to as the downlink portion 211, while the second portion is referred to as the uplink portion 215; however, some uplink communications can occur during the downlink portion and some downlink portions can occur during the uplink portion. For example, as shown in FIG. 2B and described below, S/A 106-1 can send uplink acknowledgement and negative acknowledgement transmissions (ACKs, NACKs) during both the uplink and downlink portions, while downlink control channel transmissions such as PDCCH (Physical Downlink Control Channel) transmissions may be sent during both the downlink and uplink portions.

At the beginning of the cycle shown in FIG. 2A, PLC 102 transmits information 208 on the downlink to S/A 106-1. The information may include (for example) information associated with commands for execution by S/A 106-1, data for S/A 106-1, update information for S/A 106-1, etc.

The downlink portion 211 of cycle 212 occupies a time denoted as $T_{D\text{-}DL}$. As explained in more detail below, the downlink portion 211 of the cycle time 212 can include time for an initial transmission of the information, and time for retransmission to one or more of the S/As who do not successfully receive the initial transmission. After the downlink portion of the cycle, $T_{cycle}$ includes a first processing time $T_{API}$ 213 to process (at least) the newly received information. After $T_{API}$ 213, an uplink portion 215 of the cycle 212 is designated for uplink communications 210 from S/A 106-1 to PLC 102, denoted in FIG. 2A as $T_{D\text{-}UP}$. As with the downlink portion 211 of the cycle, the uplink portion 215 of the cycle can include a first portion for an initial transmission of information from S/A 106-1 to the PLC 102, and a second portion for retransmission if necessary, as outlined below. Uplink information can include an indication that a command was executed (for a command send on the downlink portion of the current cycle or during a previous communication cycle), data related to the equipment controlled/monitored by the S/A (e.g. measurement results or status information), etc.

$T_{cycle}$ as shown in FIG. 2A also includes a processing portion $T_{AP2}$ 214 after the uplink portion 215 of the cycle 212. The processing portion 214 at the end of the cycle 212 can have the same duration or a different duration than the processing time 213 in the middle of the cycle. In an example, if end-of-cycle processing portion 214 includes processing information to send up to the application layer, the duration of the processing portion 214 at the end of the cycle may be greater than the processing portion 213 between the downlink portion 211 and uplink portion 215 of the cycle 212.

FIG. 2B illustrates communication resources for a communication cycle such as that shown in FIG. 2A, for one or more PLCs 102 communicating one or more associated S/As 106 (as in FIG. 2A), and where gNB 103 provides some control. In FIG. 2B, time is shown along the x-axis and frequency along the y-axis. The communication cycle shown in FIG. 2B includes a downlink-centric portion and an uplink-centric portion. In the illustrated example, N S/As communicate using at least N frequency portions (e.g., subcarriers or groups of subcarriers) 140-1 to 140-N, with the downlink portion of the cycle including two downlink-centric slots 120-a and 120-b and the uplink portion including two uplink-centric slots 130-a and 130-b.

For initial downlink transmissions in slot 120-a, semi-persistent scheduling (SPS) is used. At the end of slot 120-a (for example, the last symbol(s) of slot 120-1), each S/A 106-1 to 106-N sends an acknowledgement (ACK) or negative acknowledgement (NACK). FIG. 2B shows a system where the NACK indicates if the transmission was partially or fully unsuccessful. If retransmissions are needed (at least one NACK is received) they are scheduled for slot 120-b using PDCCH (Physical Downlink Control Channel) scheduling. In the example of FIG. 2B, the initial transmission to S/A 106-1 was partially unsuccessful, so it is retransmitted using the same frequency resources in slot 120-b, while the initial transmission to S/A 106-2 failed more completely, so the retransmission uses more frequency resources (N-1 of the available N frequency resources in the example shown).

Similarly, semi-persistent scheduling is used for initial uplink transmissions in slot 130-a. The uplink transmissions are followed by an uplink common burst (ULCB), and then any needed retransmissions are scheduled using PDCCH scheduling and transmitted during slot 130-b, which is also followed by an uplink common burst. In the example of FIG. 2B, the uplink transmission from S/A 106-N was partially unsuccessful, so its retransmission was scheduled for the same frequency resource 140-N, while the transmission from S/A 160-1 failed more completely, so its retransmission was scheduled for frequency resources 140-1 to 140-(N-1).

Although existing wireless system configurations can provide reliability gains compared to systems using co-located base station and controller functionality, extra communication hops may increase latency. Systems and techniques described herein can provide reliable communications with lower latency by reducing the number of over the air transmissions in controlling and monitoring S/As.

Figure 3A:
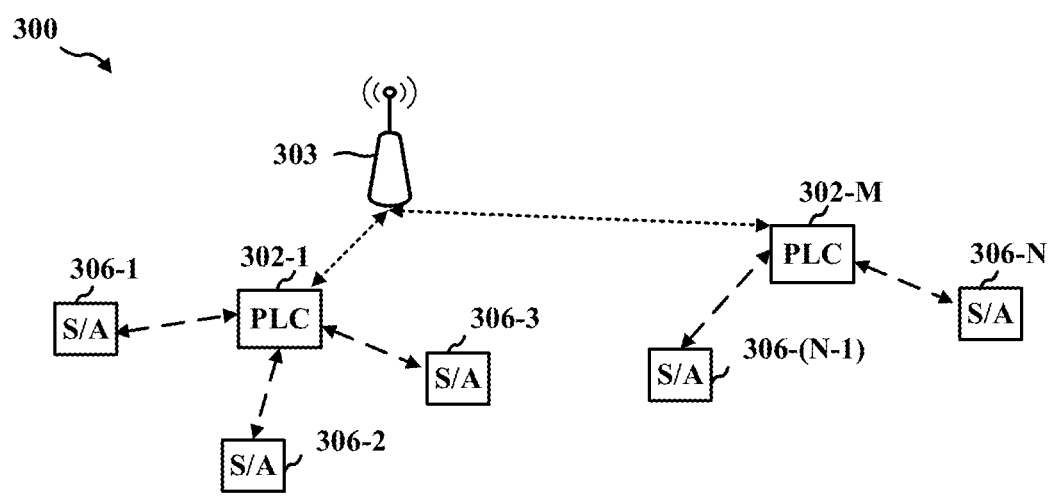
FIG. 3A illustrates an example of a wireless communication system, according to some embodiments.

FIG. 3A shows an example system 300, according to some embodiments. A gNB 303 wirelessly communicates with one or more controllers such as PLC 302-1 to 302-M, which each communicate with one or more associated S/As from among S/As 306-1 to 306-N. In the example of FIG. 3A, PLC 302-1 wirelessly communicates with S/A 306-1, 306-2, and 306-3, while PLC 302-M wirelessly communicates with S/As 306-(N-1) and 306-N.

System 300 locates gNB 303 separately from the PLCs 302-1 to 302-M, which are located proximate to the S/As 306 they control. By managing communications as outlined below, direct communication between gNB 303 and the S/As 306 is not needed, reducing the latency associated with multiple hop communications.

In this configuration, PLCs 302-1 to 302-M each act as small cells or relay nodes, with a wireless backhaul to gNB 303. During operation of the IIoT system (after acquisition and authentication), the S/As 306-1 to 306-N communicate with PLCs 302-1 to 302-M and not directly with gNB 303. In an example where PLC 302-1 acts as a small cell, its associated S/As 306-1 to 306-3 can communicate exclusively with PLC 302-1, while in an example where PLC 302-1 acts as a relay node, S/As 306-1 to 306-3 may communicate with gNB 303 for operations such as system access and authentication, and subsequently communicate exclusively with PLC 302-1. In some examples, all PLCs 302-1 to 302-M have the same capabilities, and in some examples at least some of PLCs 302-1 to 302-M have different capabilities.

Figure 3B:
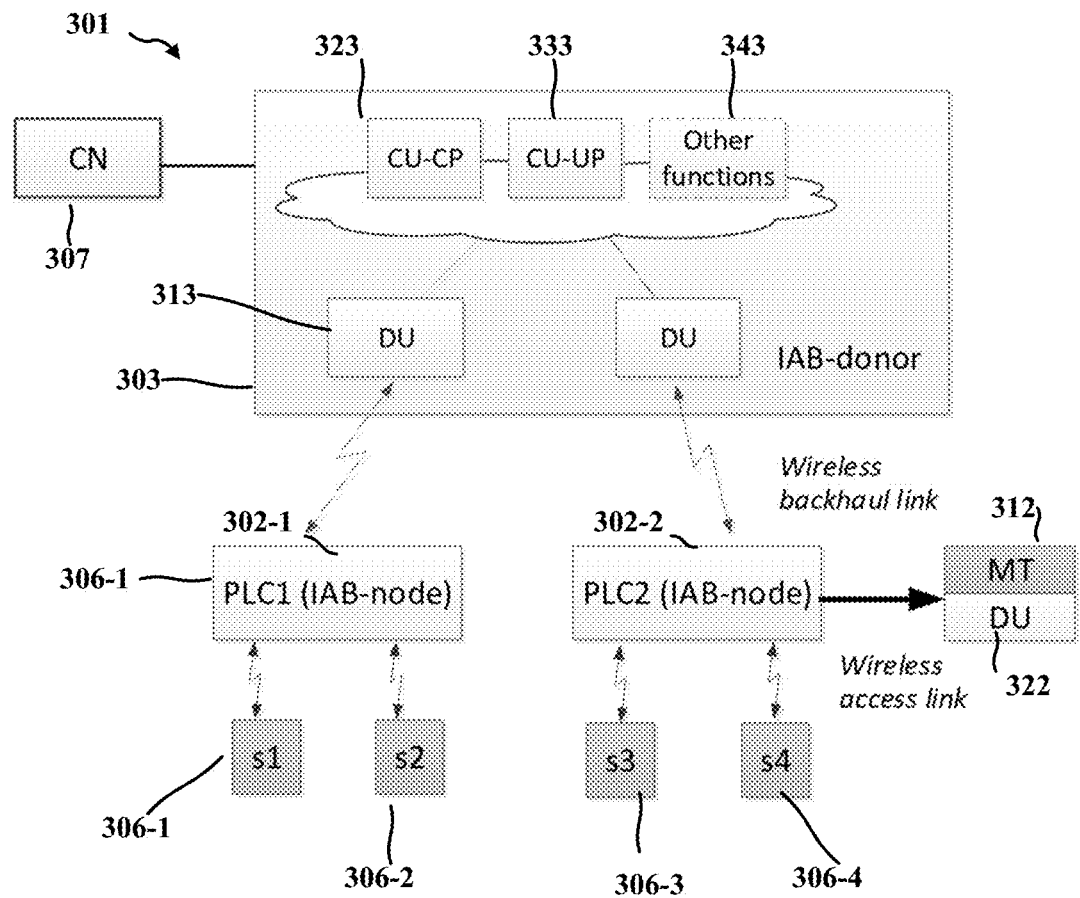
FIG. 3B illustrates an example of a wireless communication system using an Integrated Access Backhaul (IAB) framework, according to some embodiments.

In some implementations, communications among gNB 303, one or more PLCs 302, and one or more S/As 306 are managed using an Integrated Access Backhaul (IAB) framework. FIG. 3B illustrates example system 301 in the context of an IAB framework, where gNB 303 functions as an IAB-donor and shares a Central Unit/Distributed Unit (CU/DU) functional split with the PLCs 302. gNB 303 can also manage core network functionalities.

In the example shown in FIG. 3B, gNB 303 acts as a distributed unit (DU) 313 for communications with PLC 302-1 and 302-2 over a wireless backhaul link. DU functionality is implemented at gNB 303 using memory circuitry storing instructions and data, processor circuitry to execute instructions, and transceiver circuitry to transmit signals to and receive signals from the appropriate IAB-node (in the example of FIG. 3B, PLCs 302-1 and 302-2).

Within the IAB framework, gNB 303 can act as a central unit (CU) for both the control plane (CU-CP) 323 and the user plane (CU-UP) 333, and may perform other functions 343. gNB 303 can also communicate over a wired or wireless interface with core network 307 for system control, backhaul to human-machine-interface (HMI) communications, etc.

PLC 302-1 and 302-2 act as IAB-nodes with dual roles. In communications with gNB 303, PLCs 302-1 and 302-2 implement mobile terminal (MT) functionality 312 and communicate over the wireless backhaul link. PLCs 302-1 and 302-2 communicate with gNB 303 for (for example) inter-PLC coordination, backhaul to system control, etc. In communications with their associated S/As (S/A 306-1 to S/A 306-4), PLCs 302-1 and 302-2 implement DU functionality 322 and communicate over a wireless access link. PLCs 302-1 and 302-2 implement DU functionality and MT functionality using memory circuitry storing instructions and data, processor circuitry to execute instructions, and transceiver circuitry to transmit signals to and receive signals from gNB 303 (PLC implements MT functionality) and the S/As 306 (PLC implements DU functionality).

In the example of FIG. 3B, S/As take the role of UEs in their communications with the PLCs. By implementing an IAB framework, S/As 306-1 to 306-4 can use a standard Uu interface. In contrast, some previous systems would use a PC5 or sidelink communication interface with the PLCs, which required a separate interface.

In some embodiments, PLCs 302-1 and 302-2 perform local PHY/MAC (Physical/Media Access Control layer) functionalities, such as CSI-RS (Channel State Information-Resource Signal), scheduling, HARQ (Hybrid Automated Repeat ReQuest) functions, and the like, while gNB 303 performs resource management across PLCs 302-1 to 302-4. According to IAB techniques for a CU/DU split, one example of a CU/DU split between gNB 303 and PLCs 302-1 and 302-2 is to use Option 1 for data between PLCs 302-1 and 302-2 and their associated S/As 306-1 to 306-4, and to use Option 5 for data between S/As 306-1 to 306-4 and gNB 303. The above techniques can provide a number of advantages in an IAB-based configuration. Device complexity can be localized to the PLCs, since the S/As need only support the Uu interface. Additionally, latency can be improved by reducing the number of transmission hops.

Implementations of the current disclosure can provide further latency reductions using techniques that reduce the frequency of transmissions between the PLCs and gNB compared to the local traffic between the PLCs and their associated S/As. One technique to manage the communications is to use resource sharing across the access link (communications between the PLCs and their associated S/As) and across the backhaul link (communications between the gNB and the PLCs).

Figure 4:
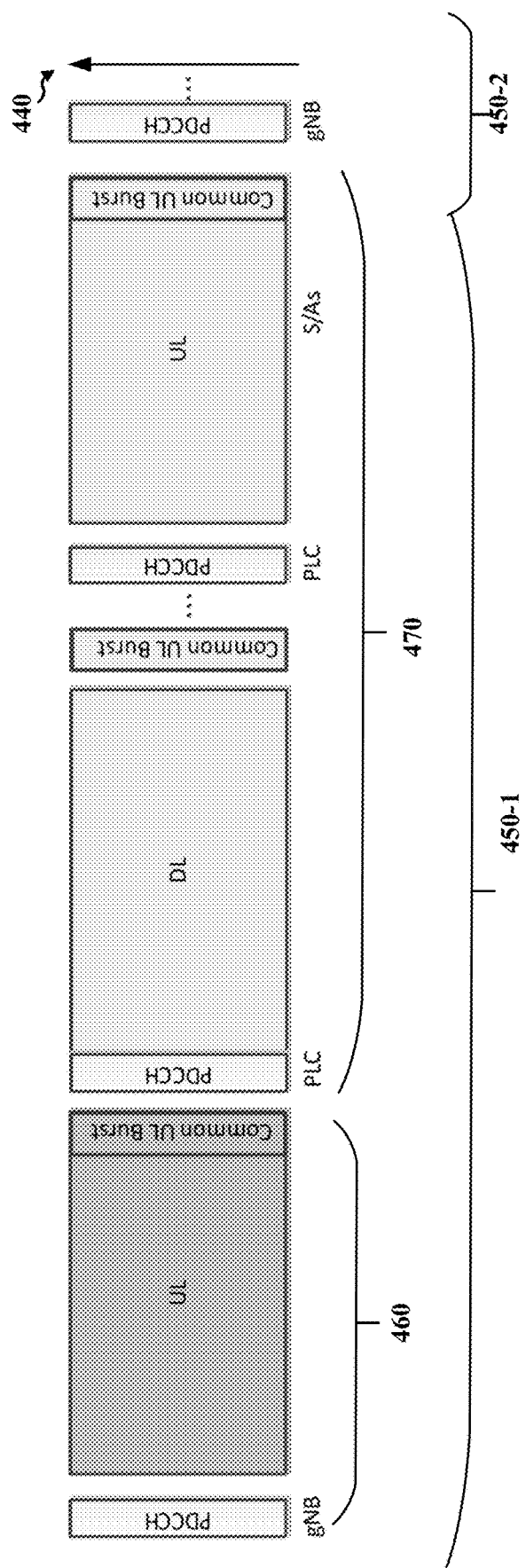
FIG. 4 shows an example of communication intervals for a semi-static split, according to some embodiments.

For example, a semi-static split between the backhaul link and the access link can be used. FIG. 4 shows an example of time and frequency resources for a semi-static split, with time along the x-axis and frequency along the y-axis. As shown in FIG. 4, a recurring set of time resources 450-1 and 450-2 (partially illustrated) each include a first duration 460 assigned to the backhaul link (during which the PLCs 302 communicate with the gNB 303) and a second duration 470 assigned to the access link (during which the PLCs 302 communication with their S/As 306). In order to reduce latency for operation of the IIoT system, the second duration 470 is greater than the first duration 460. Note that throughout this description, the terms "first" and "second" do not imply that first element necessarily precedes the second in time.

For PLC/gNB communications during first duration 460, the PLCs 302 assume the role of MTs, while gNB 303 assumes the DU role. The first duration 460 can include transmission of PDCCH from gNB 303 to PLCs 302-1 and 302-2. PLCs 302-1 and 302-2 transmit to gNB 303 on assigned resources during an uplink portion of first duration 460, and a common uplink burst is scheduled at the end of the first duration 460. As shown in FIG. 4, first duration 460 is shown with only an uplink portion; however, first duration 460 could include a single uplink portion, a single downlink portion, or combinations of uplink and downlink portions, depending on the implementation. First duration 460 encompasses a plurality of symbols; for example, one or more slots, minislots, or other time durations. Frequency resources during the first duration 460 may include one or more subcarriers assigned to different PLCs and/or frequency resources common to a plurality of PLCs.

During second duration 470, the PLCs assume the role of a DU, while the S/As assume the role of an MT. For example, PLC 302-1 transmits PDCCH to S/As 306-1 and 306-2 during a first (downlink-centric) slot 420-1, using some or all of frequency resources 440, transmits downlink traffic to S/As 306-1 and 306-2 during different portions of frequency resources 440 in subsequent symbols of first slot 420-1, and receives information from S/As 306-1 and 306-2 during an uplink common burst at the end of first slot 420-1. At the end of second duration 470, PLC 302-1 transmits PDCCH to S/As 306-1 and 306-2 during an Nth (uplink-centric) slot 430-N, receives uplink traffic from S/As 306-1 and 306-2, and then receives an uplink common burst from S/As 306-1 and 306-2. After the end of second duration 470, another of the recurring set of time resources 450-2 begins. Second duration 470 includes at least one transmission cycle with a downlink portion for transmissions from the PLCs to the S/As, and at least one uplink portion from the S/As to the PLCs. Second duration 470 can be referred to as a gNB "gap-out" period, during which the gNB yields communication resources to the PLCs and S/As.

In some implementations, cyclic transmissions similar to those shown in FIGS. 2A and 2B can be used for first duration 460 and/or second duration 470. For example, a first slot of second duration 470 can be semi-persistently scheduled (with PDCCH either zero symbols or a small number of symbols to schedule non-resource allocation transmissions) and can be followed by a second slot including PDCCH scheduling of retransmissions for those S/As that transmitted a NACK in response to the first transmission, with each S/A 306 that needs a retransmission assigned one or more frequency portions of frequency resources 440. While the control transmissions of FIGS. 2A and 2B such as PDCCH are provided by gNB 103, the control transmissions in the current embodiments are provided by PLC 302.

The embodiment of FIG. 4 provides reduced latency for traffic between the PLCs and S/As, with regular intervals during which gNB can perform control functions, such as resource allocation among the PLCs.

One challenge in using this implementation is determining the relative lengths of first duration 460 and second duration 470. Increasing the second duration 470 allows for more resources dedicated to traffic between the PLCs and their associated S/As, but may make it difficult for gNB to effectively manage resource allocation or other issues. On the other hand, dedicating more resources to gNB control makes it more difficult to meet latency requirements.

Figure 5:
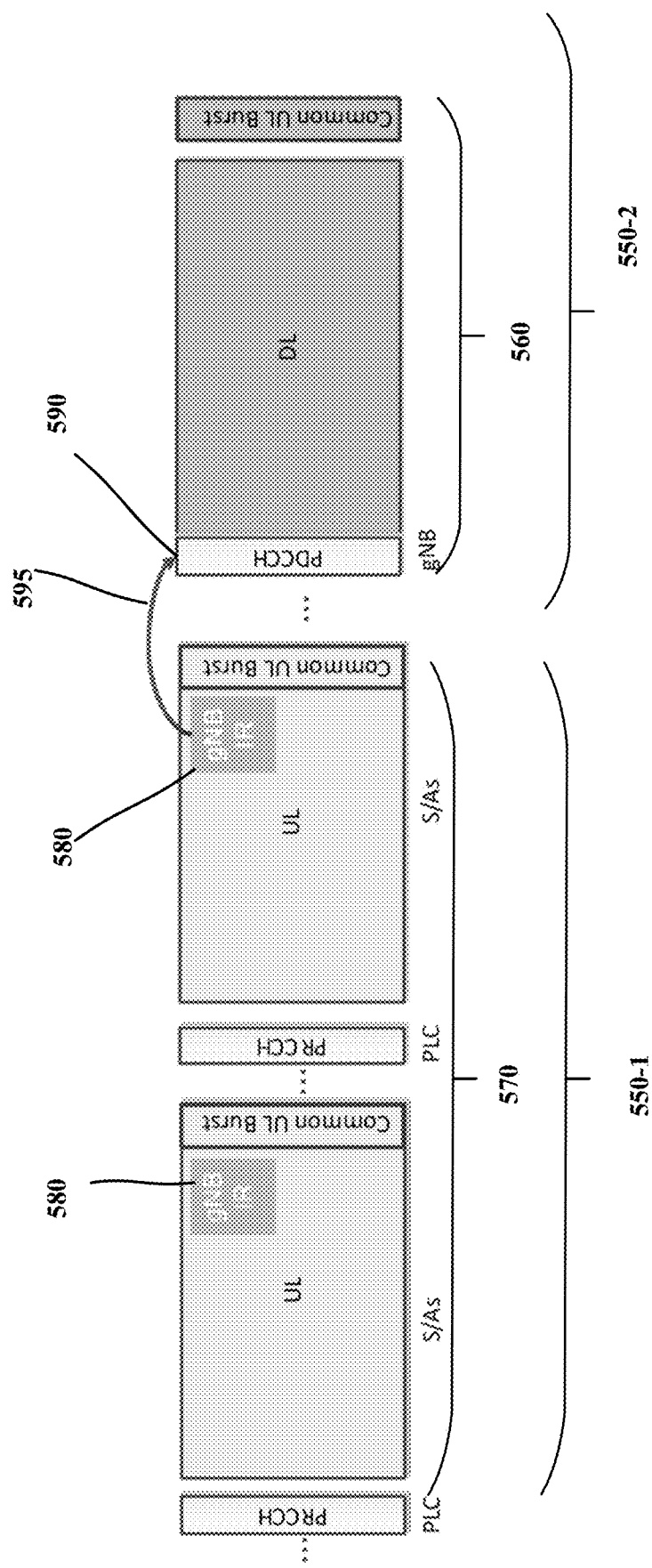
FIG. 5 shows an example of communication intervals for a semi-static split, including interrupt resources, according to some embodiments.

In some implementations, interrupt resources may be used for dynamic gNB control. FIG. 5 illustrates an embodiment in which an interrupt is used to dynamically schedule gNB control. In FIG. 5, gNB 303 configures interrupt resources (IR) 580, which are time and frequency resources for gNB 303 to indicate a switch time 590 for the gNB to communicate with the PLCs 302 at a time other than (for example) a scheduled first duration 460 of the recurring time resources 450 of the semi-static split shown in FIG. 4. That is, IR 580 are used to give gNB 303 control during time resources that would have been used for traffic between PLCs 302 and S/As 306.

There are a number of different ways in which gNB can configure interrupt resources. In a first example, gNB may act as another UE to PLC in the PLC's UL slot. That is, interrupt resources can be configured so that gNB is allotted resources within the uplink portion of a communication cycle between the PLC and the S/As, and use Physical Uplink Control Channel (PUCCH)/Physical Uplink Shared Channel (PUSCH) signaling to use IR 580 to schedule a switch time that indicates when the gNB to communicate with the PLCs at a time other than a first duration 460 (the time allotted for gNB/PLC communication in the semi-static switch). In another example, gNB 303 can configure PDCCH monitoring occasions for PLCs as the IR 580.

In either example, IR 580 may include information indicating an offset 595 indicating an amount of time between the IR and the switch time 590 to gNB/PLC communication. In the example shown in FIG. 5, during IR 580-2, gNB indicates a request or command for resources to communicate with one or more of the PLCs, and indicates an offset 595 between IR 580-1 and the time during which gNB will begin communications with some or all of the PLCs. One or more communication cycle portions may occur during the offset 595. At the switch time, a new set of time resources 550-2 (beginning with first duration 560) may begin, or the set of time resources 550-1 will resume, depending on the implementation.

In some embodiments, IR 580 may include priority information, and the interrupt may be a request for gNB control that may be refused by one or more of the PLCs. For example, IR 580 may include an indication of a priority of the information that the gNB would like to communicate to one or more of the PLCs. The PLCs then transmit an acknowledgement (ACK) or non-acknowledgement (NACK) to indicate whether or not the PLC will communicate with the gNB during the requested interval.

In some cases, IR 580 can be common across PLCs so that the interrupt can be broadcast-based. When resource allocations need to be changed, gNB generally has to communicate with more than one PLC, since when one PLC needs more resources to increase the reliability of its communications with S/As, resource allocations to one or more other PLCs usually need to be decreased.

Examples that use dynamic gNB control can provide more flexible and better performing communication between PLCs and their associated S/As than a semi-static split between the backhaul link and the access link alone. Without dynamic control, second duration 470 of FIG. 4 would be chosen to be small enough so gNB could manage resources effectively; however, this reduces the resources to be used for communications between the PLCs and their S/As. With dynamic gNB control, the second duration could be extended and if the gNB needs to take back control before the next instance of first duration, it has a mechanism to do so.

FIGS. 6 to 11 below show example structures and flow diagrams for implementing the techniques described above.

Figure 6:
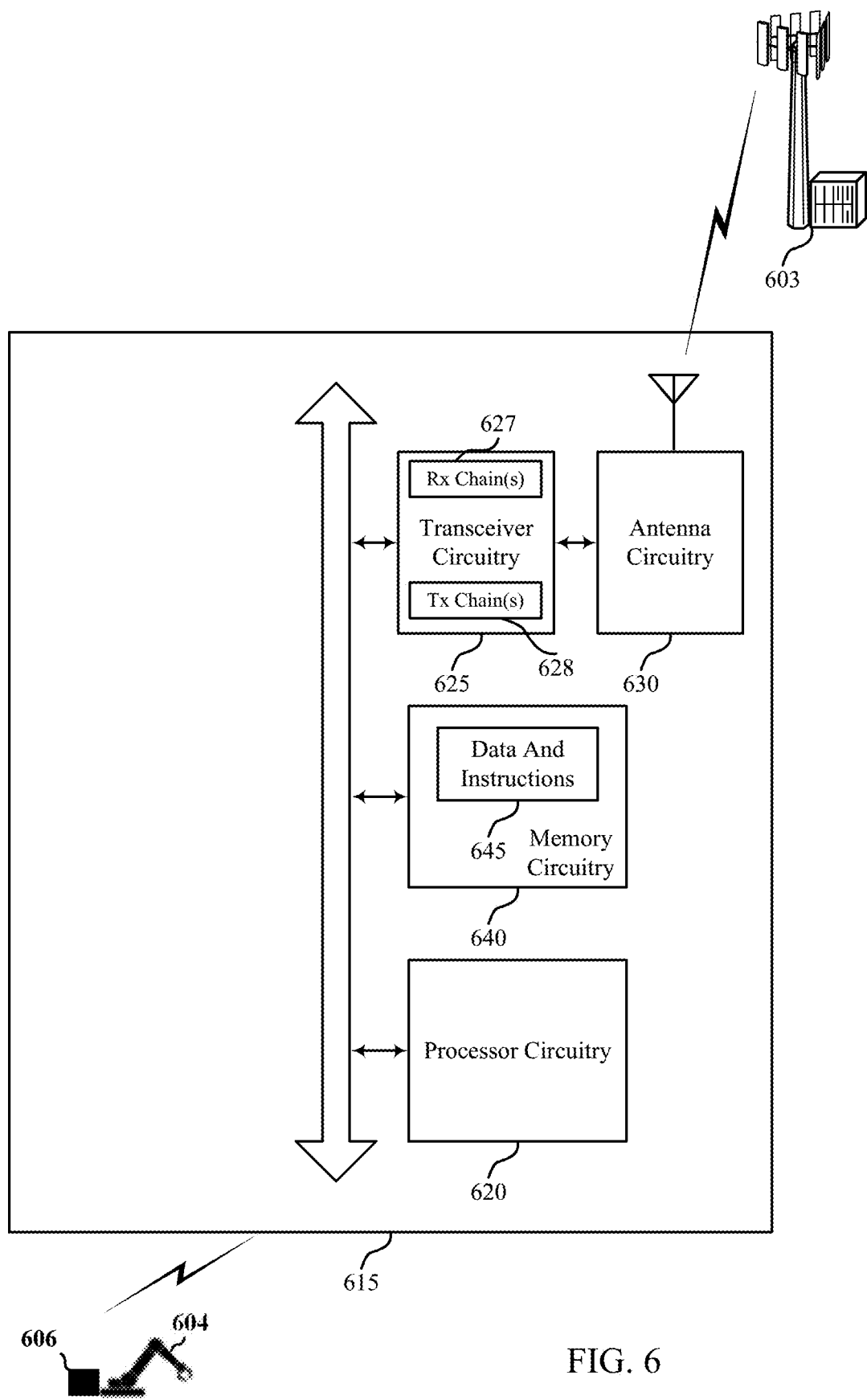
FIG. 6 shows an example of a controller to communicate with a base station and one or more sensor/actuators, according to some embodiments.

FIG. 6 shows a simplified drawing of an example controller PLC 602. In operation, PLC 602 communicates with a base station gNB 603 and one or more S/As 606 associated with equipment 604. PLC 602 includes antenna circuitry 630, transceiver circuitry 625, processor circuitry 620 and memory circuitry 640, including data and instructions 645. Transceiver circuitry 625 includes one or more receive (Rx) chains 627 having RF components such as amplifiers, analog to digital converters, mixers, oscillators, filters, etc. for processing received downlink signals, as well as one or more transmit (TX) chains 628 including RF components to generate signals to transmit on the uplink). PLC 602 includes processor circuitry 620 and memory circuitry 640. Processor circuitry 620 and memory circuitry 640 are shown as discrete blocks, but may be implemented in a number of ways; for example, processor circuitry may be implemented in one or more dedicated areas of a chip or in different chips, and at least some of memory circuitry 640 may be integrated with the processor circuitry. Similarly, memory circuitry 640 may be implemented as a main memory with or without the addition of other portions of memory circuitry on the same or different chips, and at least some of processor circuitry 620 may be integrated with memory circuitry 640. Note that herein "processor circuitry" "memory circuitry" and similar language is used to refer to structure. Instructions stored in memory circuitry 640 and executed by processor circuitry 620 cause PLC 602 to perform operations described more completely below.

Figure 7:
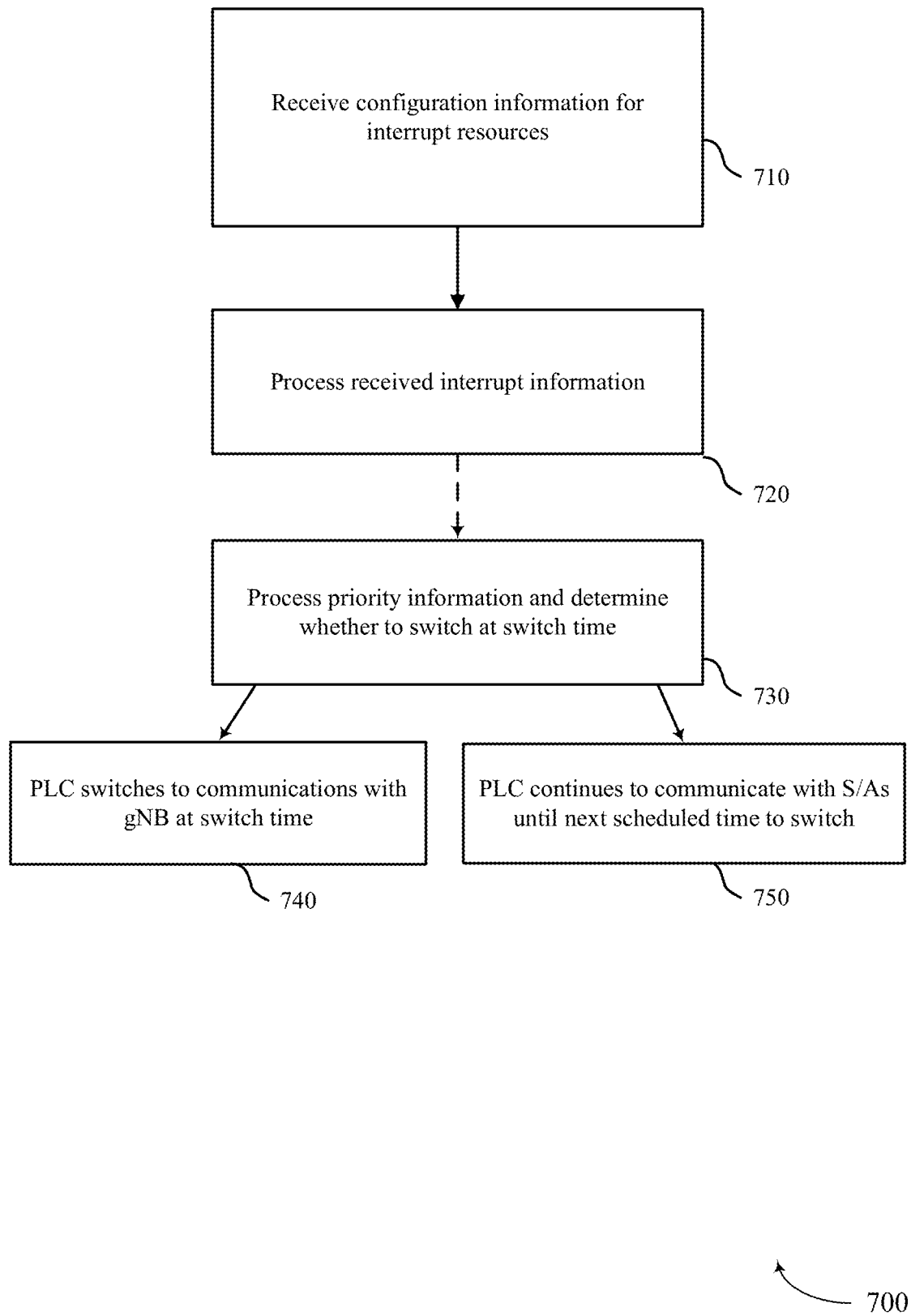
FIG. 7 shows a flow chart for a controller communicating with a base station and one or more sensor/actuators, according to some embodiments.

FIG. 7 shows a flowchart of a method 700 that can be performed by a controller such as PLC 302 or 602. At 710, the controller receives configuration information for interrupt resources. The interrupt resources include time resources included in a time interval for communications between the controller and one or more associated S/As. The interrupt resources may be configured based on receiving PUCCH and/or PUSCH signaling from gNB 603 (as described above in the implementation in which gNB 303 acts as a UE), based on receiving an indication of one or more PDCCH monitoring occasions, or configured differently. In some embodiments, at least some configuration information for interrupt resources may be received as broadcast signaling from gNB 603. gNB 603 can send a common interrupt request across multiple PLCs, so the PLCs can all stop transmitting during the interrupt resources, and so multiple PLCs can have resources re-allocated as necessary. As shown in FIG. 5, interrupt resources may be periodic, with the periodicity selected to balance the need for gNB 603 to mitigate communication problems quickly with the need to allocate sufficient PLC/SA communication resources for latency targets.

At 720, PLC 602 processes interrupt information received using the interrupt resources to determine a switch time, where the switch time is a time to switch from communications between PLC 602 and the one or more associated S/As to communications between PLC 602 a base station such as gNB 603. The switch time may be indicated explicitly or implicitly. An example of an implicit indication is a case where the switch time is the same for all interrupts (e.g., the start of the next slot, minislot, subframe, the start of the second next slot, etc.), where the switch time is based on a priority (e.g., an indication of high priority implicitly indicates a switch time at the start of the next slot, etc.), the switch time is based on a type of control information (e.g., a switch time for resource allocation is implicitly the beginning of the next slot etc.), or based on another parameter (a mode, a status, a device type, an emergency or criticality indication, etc. is associated with a particular switch time or calculation for a switch time).

An example of an explicit indication is an indicated offset. The offset indicates a wait time before the switch time, and may be provided in a number of ways. For example, the offset may indicate a symbol index of the switch time, a subframe index of the switch time, a wait time expressed as an offset number of symbols or slots from a current symbol, from a beginning symbol of a current slot, from an end symbol of a current slot, or some other expression of wait time. Failure to indicate an offset, or indicating an offset value equal to some value such as zero may indicate that the switch time is the beginning of the next slot, minislot, subframe, or other time location.

In some embodiments, the interrupt information includes priority information, which indicates a priority for switching to communications between the controller and the base station. For example, if gNB 603 wants to send or update high level information, it may indicate a relatively low priority, while if gNB 603 wants to change resource allocation due to interference and/or blocking, it may indicate a relatively high priority. At 730, PLC 602 optionally processes the interrupt information to determine the priority information and determines whether to switch to communications between the controller and the base station at the switch time or to continue communicating with the one or more S/As 606. In some embodiments, PLC 602 optionally transmits an ACK to gNB 303 in response to determining to switch to communications between the controller and the base station at the switch time or transmits a NACK to gNB 303 in response to determining not to switch to communications between the controller and the base station at the switch time.

At 740, PLC 602 switches to communications with the gNB at the switch time if PLC 602 does not have an option to determine whether or not to switch to communications with gNB 603 at the switch time or if it has the option and determines to switch. At the switch time, a new set of time resources may begin, or the current set of time resources will resume after the interrupt, depending on the implementation Alternatively, at 750, if PLC 602 does not receive interrupt information indicating a switch time or if the interrupt information includes priority information and PLC 602 determines not to switch, PLC 602 continues to communication with its associated one or more S/As 606 until it is next scheduled to switch to communications with gNB 603. For the example of the semi-static split of FIGS. 4 and 5, PLC 602 keeps communicating with its S/As 606 until the end of the second duration of the current set of time resources and changes at the beginning of the first duration of the next of the recurring set of time resources (the next scheduled time to switch). According to some embodiments, when PLC 602 is communicating with its S/As 606, it can use cyclic communications. The plurality of cyclic communications in these embodiments include a downlink-centric portion in which PLC 602 transmits data, commands, etc. to S/As 606 and an uplink-centric portion in which PLC 602 receives data from S/As 606 (such as measurement data based on commands in a downlink-centric portion of a previous cycle, health or status information, etc.). The downlink-centric portion can include a first set of semi-statically configured transmissions from the controller to the one or more associated S/As 606, using different frequency resource(s) for each of the one or more S/As. The downlink-centric portion can include at least one ACK/NACK symbol, and PLC 602 receives ACKs and NACKS from its S/As 606 transmitted on the at least one ACK/NACK symbol. In response to at least one NACK, PLC 602 transmits PDCCH including scheduling information for retransmission each of the associated S/A(s) 606 that transmitted a NACK.

Referring to FIGS. 6 and 7, PLC 602 receives and transmits information according to the techniques outlined in FIG. 7 using antenna circuitry 630 and transceiver circuitry 625, and processes the information and makes determinations using processor circuitry 620 and using memory circuitry 640 to store data and instructions 645.

Figure 8:
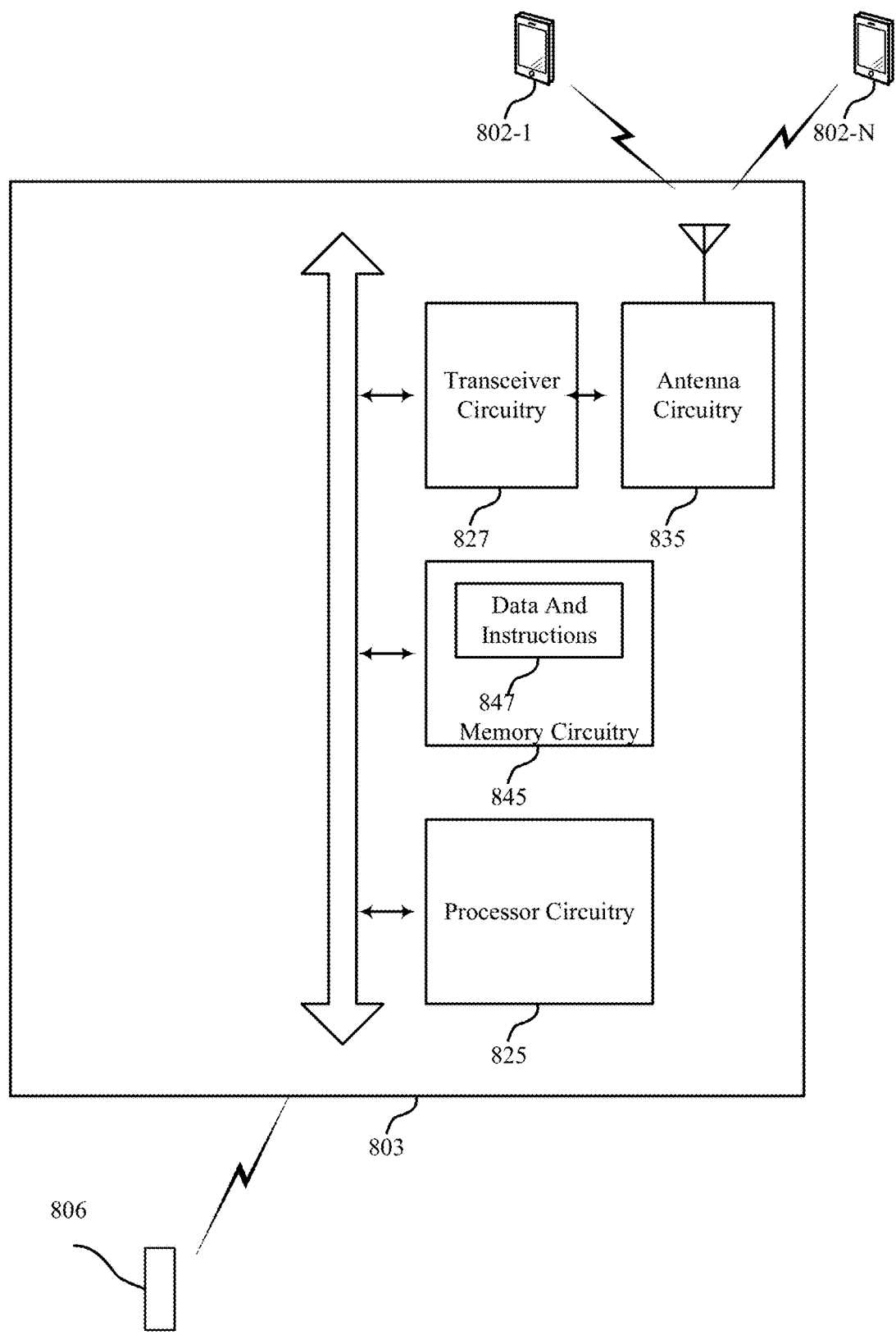
FIG. 8 shows an example of a base station to communicate with one or more controllers and optionally one or more sensor/actuators, according to some embodiments.

FIG. 8 shows a simplified drawing of an example base station gNB 803, according to some embodiments. In operation, gNB 803 communicates with one or more controllers such as PLCs 802-1 and 802-2. In some embodiments, gNB 803 communicates exclusively with PLCs 802 and does not communicate with S/As 806. Optionally, gNB 803 can communicate with S/As 806 for some systems or under some circumstances; for example, when its associated PLC 802 is a relay node without capability to perform actions such as acquisition and authentication. In such systems, gNB 803 communicates exclusively with PLCs 802 during the time PLCs are controlling S/As 806. gNB 803 includes antenna circuitry 835, transceiver circuitry 827, processor circuitry 825 and memory circuitry 845, including data and instructions 847. Transceiver circuitry 827 includes one or more receive (Rx) chains having RF components such as amplifiers, analog to digital converters, mixers, oscillators, filters, etc. for processing received downlink signals, as well as one or more transmit (TX) chains including RF components to generate signals to transmit on the uplink). Processor circuitry 825 and memory circuitry 845 are shown as discrete blocks, but may be implemented in a number of ways; for example, processor circuitry may be implemented in one or more dedicated areas of a chip or in different chips, and in some implementations at least some of memory circuitry 845 may be integrated with the processor circuitry 825. Similarly, memory circuitry 845 may be implemented as a main memory with or without the addition of other portions of memory circuitry on the same or different chips, and in some implementations at least some of processor circuitry 825 may be integrated with memory circuitry 845. Instructions stored in memory circuitry 845 and executed by processor circuitry 825 cause gNB 803 to perform operations described more completely below.

Figure 9:
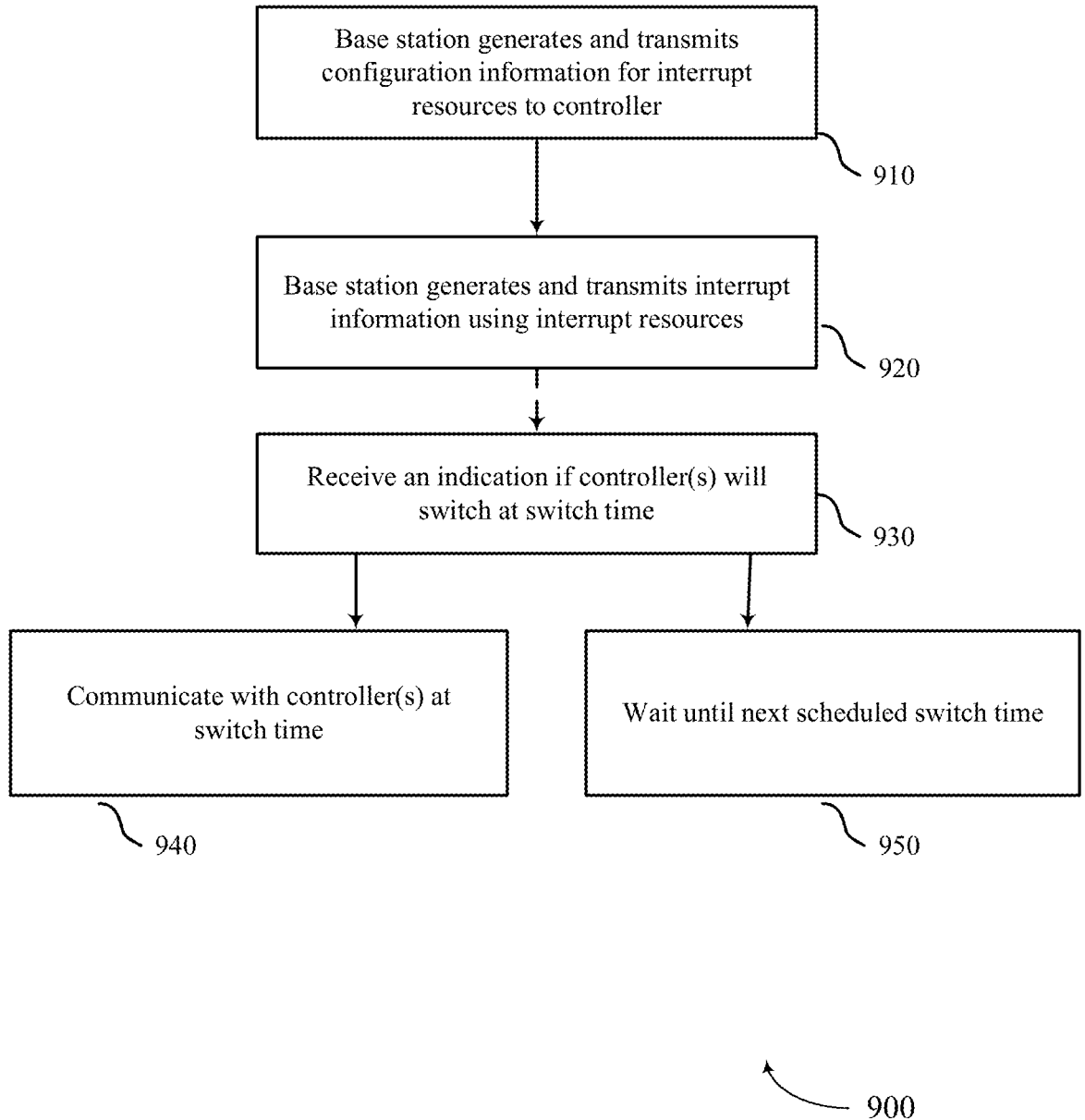
FIG. 9 shows a flow chart for a base station communicating with one or more controllers and optionally one or more sensor/actuators, according to some embodiments.

FIG. 9 shows a flowchart of a method 900 that can be performed by a base station such as gNB 303 or 803. At 910, gNB generates and transmits configuration information for interrupt resources to a controller such as PLC 302 or 802. The interrupt resources include time resources included in a time interval for communications between the controller and one or more associated S/As 306 or 806 (e.g. during the second duration of FIG. 5). gNB 803 may configure interrupt resources using PUCCH and/or PUSCH (e.g., gNB 803 acts as a UE, as described above), may configure one or more PDCCH monitoring occasions, or may configure the resources differently. In some embodiments, at least some configuration information for interrupt resources may be broadcast from gNB 803. As shown in FIG. 5, interrupt resources may be periodic, with the periodicity selected to balance the need for gNB 803 to mitigate communication problems quickly with the need to allocate sufficient PLC/SA communication resources for latency targets.

At 920, gNB 803 generates and transmits interrupt information using the interrupt resources. The interrupt information includes information indicative of a switch time, where the switch time is a time for the controller to switch from communications between the controller and its one or more associated UEs to communications between the controller and gNB 803. As noted above, the switch time may be indicated explicitly or implicitly. An example of an implicit indication is a case where the switch time is the same for all interrupts (e.g., the start of the next slot, minislot, subframe, etc.), where the switch time is based on a priority (e.g., an indication of high priority implicitly indicates a switch time at the start of the next slot, etc.), the switch time is based on a type of control information (e.g., a switch time for resource allocation is implicitly the beginning of the next slot etc.), or based on another parameter (a mode, a status, a device type, an emergency or criticality indication, etc.)

An example of an explicit indication is an offset. The offset indicates a wait time before the switch time, and may be provided in a number of ways. For example, the offset may indicate a symbol index of the switch time, a subframe index of the switch time, a wait time expressed as an offset number of symbols or slots from a current symbol, from a beginning symbol of a current slot, from an end symbol of a current slot, or some other expression of wait time. Failure to indicate an offset, or indicating an offset value equal to some value such as zero may indicate that the switch time is the beginning of the next slot, minislot, subframe, or other time resource.

The interrupt information can optionally include priority information. If gNB 803 indicates priority, at 930 gNB 803 may subsequently (also optionally) receive an indication from the PLCs that they will switch at the switch time, or that they will not switch at the switch time. In some embodiments, gNB 803 may receive an ACK from a first PLC 802-1 as an indication that it will switch from communications with its one or more associated S/As to communication with the gNB 803 at the switch time, or may receive a NACK as an indication PLC 802-1 will not switch.

At 940, gNB communicates with the PLCs 802 at the switch time if the PLCs 802 do not have an option to determine whether or not to switch to communications with gNB 803 at the switch time, or if the PLCs 802 have the option and determine to switch. At the switch time, a new set of recurring time resources may begin, or the current set of time resources will resume after the interrupt, depending on the implementation.

Alternatively, at 950, in the absence of a determination by gNB 803 to initiate an interrupt, or if the PLCs 802 have an option to switch and determine not to switch, gNB 803 waits until the next scheduled duration for communication with the PLCs. For the example of the semi-static split of FIGS. 4 and 5, gNB 803 waits until the end of the second duration of the current set of time resources and begins communicating with the PLCs 802 at the beginning of the first duration of the next of the recurring set of time resources (the next scheduled time to switch).

Referring to FIGS. 8 and 9, gNB 803 receives and transmits information according to the techniques outlined in FIG. 9 using antenna circuitry 835 and transceiver circuitry 827, and processes the information, generates information for transmission, and makes determination using processor circuitry 825 and using memory circuitry 845 to store data and instructions 847.

Figure 10:
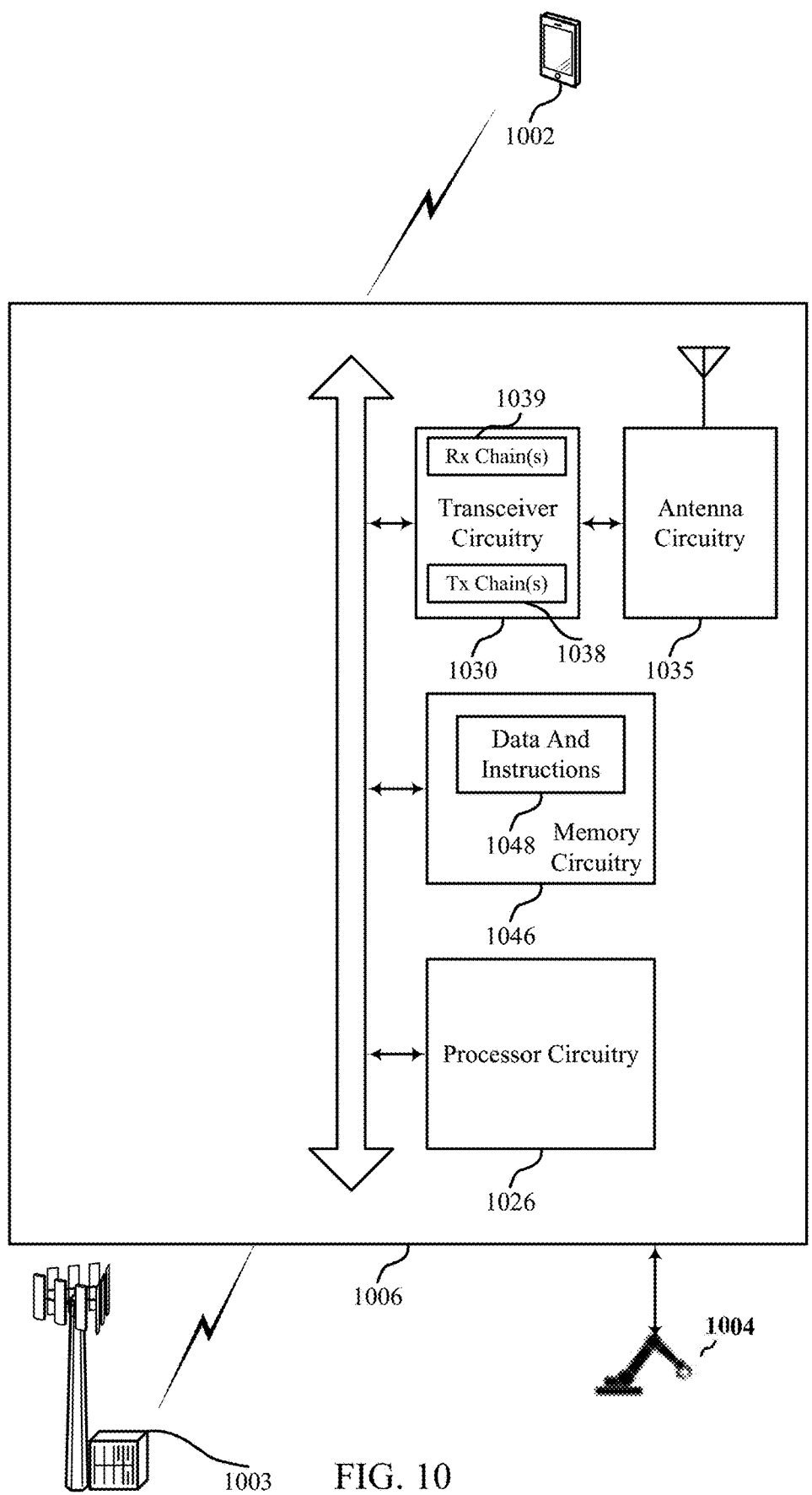
FIG. 10 shows an example of a sensor/actuator to communicate with a controller and optionally a base station, according to some embodiments.

FIG. 10 shows a simplified drawing of an example S/A 1006, according to some embodiments. In operation, S/A 1006 communicates with a particular controller such as PLC 1002. As noted above, S/A 1006 may communicate exclusively with PLC 1102 or optionally can communicate with gNB 1003 for some systems or under some circumstances; for example, when PLC 1002 is a relay node without capability to perform actions such as acquisition and authentication with S/A 1006. S/A 1006 manages equipment 1004, using a wired or wireless interface. S/A 1006 includes antenna circuitry 1035, transceiver circuitry 1030, processor circuitry 1026 and memory circuitry 1046, including data and instructions 1048. Transceiver circuitry 1030 includes one or more receive (Rx) chains 1039 having RF components such as amplifiers, analog to digital converters, mixers, oscillators, filters, etc. for processing received downlink signals, as well as one or more transmit (TX) chains 1038 including RF components to generate signals to transmit on the uplink). Processor circuitry 1026 and memory circuitry 1046 are shown as discrete blocks, but may be implemented in a number of ways; for example, processor circuitry may be implemented in one or more dedicated areas of a chip or in different chips, and in some implementations at least some of memory circuitry 1046 may be integrated with the processor circuitry. Similarly, memory circuitry 1046 may be implemented as a main memory with or without the addition of other portions of memory circuitry on the same or different chips, and in some implementations at least some of processor circuitry 1026 may be integrated with memory circuitry 1046. Note that herein "processor circuitry" "memory circuitry" and similar language is used to refer to structure. Instructions stored in memory circuitry 1046 and executed by processor circuitry 1026 cause S/A 1006 to perform operations described more completely below.

Figure 11:
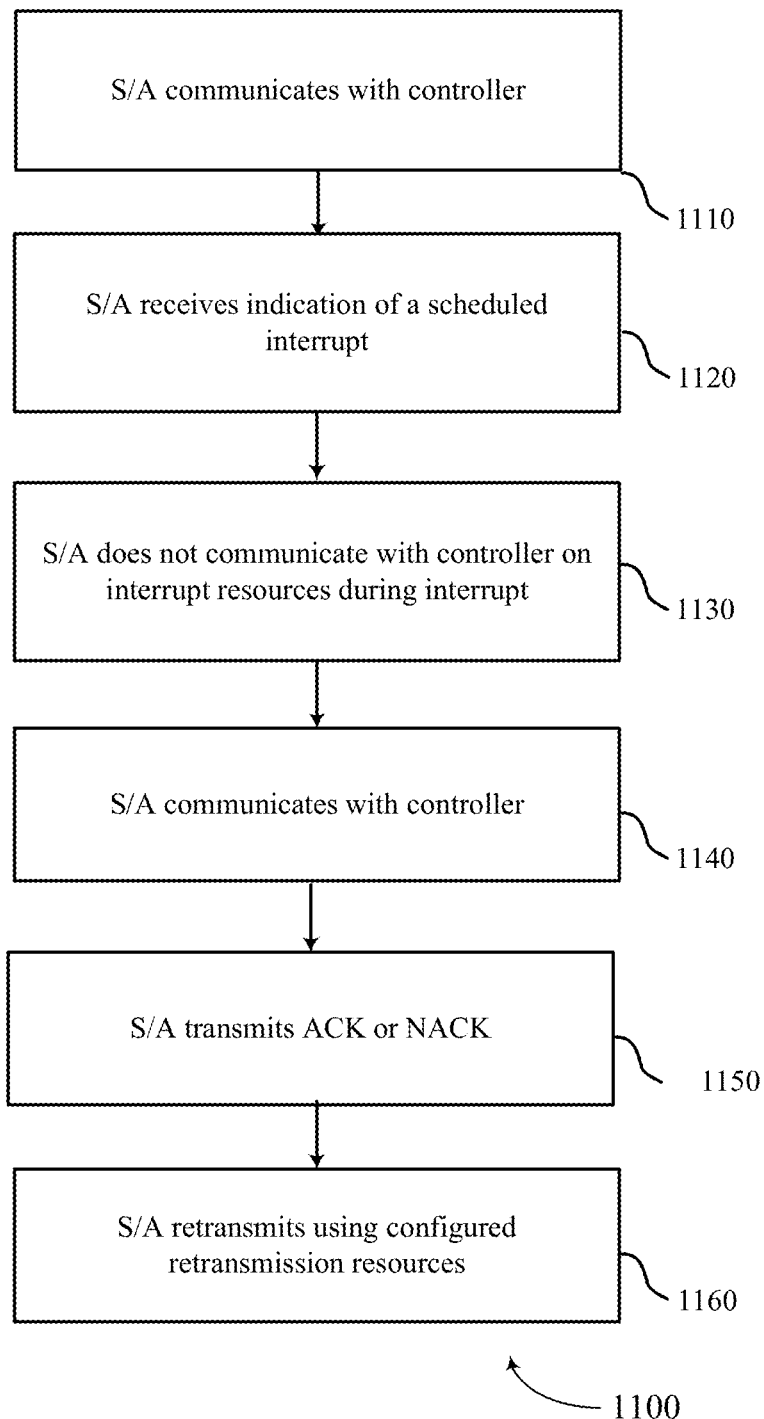
FIG. 11 shows a flow chart for a sensor/actuator communicating with a controller and optionally a base station, according to some embodiments.

FIG. 11 shows a flowchart of a method 1100 that can be performed by an S/A 306 or 1006. At 1110, S/A 1106 communicates with a controller such as PLC 1102 according to a semi-static split, the semi-static split comprising a recurring set of time resources including a first duration and a second duration greater than the first duration. S/A 1106 communicates with PLC 1102 according to the semi-static split by communicating with PLC 1102 during the second duration and not communicating with the controller during the first duration. In some embodiments, S/A 1106 communicates with PLC 1102 using a Uu interface. At 1120, S/A 1106 receives an indication from the controller that an interrupt is scheduled during a second duration of a particular set of the recurring time resources for one or more frequency resources. At 1130, S/A 1106 does not communicate with PLC 1102 during the interrupt using the one or more frequency resources.

During the second duration, in the absence of an interrupt, at 1140 S/A 1106 communicates with PLC 1102 using cyclic communications. The cyclic communications between the controller and the S/A 1106 each include a downlink-centric portion and an uplink-centric portion, where the downlink-centric portion includes a semi-statically configured first transmission from PLC 1102 to S/A 1106 on one or more assigned frequency resources. At 1150, S/A 1106 transmits an ACK or a NACK subsequent to the first transmission. At 1160, in response to sending a NACK, S/A 1106 receives a Physical Downlink Control Channel (PDCCH) transmission from PLC 1102 scheduling one or more frequency resources for retransmission, wherein the one or more frequency resources for retransmission may be the same or different than the one or more frequency resources for the first transmission.

Referring to FIGS. 10 and 11, S/A 1106 receives and transmits information according to the techniques outlined in FIG. 11 using antenna circuitry 1035 and transceiver circuitry 1030, and processes the information and makes determination using processor circuitry 1026 and using memory circuitry 1046 to store data and instructions 1048.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different (physical) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both computer storage media and communication media including any medium that facilitates transfer of a computer program from one place to another. A computer storage medium may be any available medium that can be accessed by a general purpose or special purpose computer but the phrase "computer storage medium" does not refer to a transitory propagating signal. By way of example, and not limitation, computer storage media can comprise RAM, ROM, electrically erasable programmable read only memory (EEPROM), compact disk (CD) ROM or other optical disk storage, magnetic disk storage or other magnetic storage devices, or other medium that can be used to store desired program code means in the form of instructions or data structures and that can be accessed by a general-purpose or special-purpose computer, or a general-purpose or special-purpose processor. Also, a connection that transmits information is referred to as a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of communication medium.

The techniques herein are described with reference to systems that use wide bands, such as 5G or new radio (NR) systems and future systems that use spectrum in the mmW range of the electromagnetic spectrum. If applicable, techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes a 5G system for purposes of example, and 5G terminology is used in much of the description above, although the techniques are applicable beyond 5G applications.

Base stations may include or may be referred to by those skilled in the art as a base transceiver station, a radio base station, an access point (AP), a radio transceiver, a NodeB, eNodeB (eNB), Home NodeB, a Home eNodeB, gNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same or similar reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication at a controller comprising:
   receiving configuration information for interrupt resources from a base station, the interrupt resources including time resources included in a time interval for communications between the controller and one or more associated Sensor/Actuators (S/As); and
   processing interrupt information received using the interrupt resources to determine a switch time, wherein the switch time is a time to switch from communications between the controller and the one or more S/As to communications between the controller and the base station,
   wherein the interrupt information includes priority information associated with information to be sent by the base station, the priority information indicating a priority for switching from communications between the controller and the one or more S/As to communications between the controller and the base station.

2. The method of claim 1, further comprising:
   processing the interrupt information to determine the priority information; and
   determining whether to switch to communications between the controller and the base station at the switch time or to continue communicating with the one or more associated S/As.

3. The method of claim 2, further comprising:
   transmitting an acknowledgement to the base station in response to processing the interrupt information; and
   switching to communications between the controller and the base station at the switch time.

4. The method of claim 2, further comprising:
   transmitting a negative acknowledgement (NACK) to the base station in response to processing the interrupt information; and
   maintaining communications between the controller and the base station at the switch time.

5. The method of claim 1, wherein processing the interrupt information received using the interrupt resources to determine the switch time further comprises processing interrupt information to determine an offset, the offset indicating a wait time before the switch time.

6. The method of claim 5, wherein processing the interrupt information to determine the offset further comprises processing the interrupt information to determine an implicitly indicated offset or an explicitly indicated offset, wherein the offset indicates a particular slot, mini-slot, symbol, or subframe, and wherein the switch time is included in the particular slot, mini-slot, symbol, or subframe.

7. The method of claim 1, wherein receiving configuration information for interrupt resources from the base station further comprises receiving an indication of one or more physical downlink control channel (PDCCH) monitoring occasions from the base station.

8. The method of claim 1, wherein receiving configuration information for interrupt resources from the base station further comprises receiving physical uplink control channel (PUCCH) signaling from the base station, physical uplink shared channel (PUSCH) signaling from the base station, or both.

9. The method of claim 1, wherein receiving configuration information for interrupt resources from the base station further comprises receiving broadcast signaling including at least some configuration for interrupt resources from the base station.

10. The method of claim 1, wherein the interrupt resources are periodic.

11. The method of claim 1, wherein in an absence of interrupt information from the base station indicating the switch time, the method further comprises switching between communications with the base station and communications with the one or more S/As using a semi-static split.

12. The method of claim 11, wherein the semi-static split comprises a recurring set of time resources, the recurring set of time resources including a first duration during which the controller communicates with the base station and a second duration during which the controller communicates with the one or more S/As, and wherein the second duration is greater than the first duration.

13. The method of claim 12, wherein the time resources included in the time interval for communications between the controller and one or more associated S/As further comprise time resources included in the second duration.

14. The method of claim 12, wherein the second duration includes a plurality of cyclic communications between the controller and the one or more associated S/As.

15. The method of claim 14, wherein the plurality of cyclic communications between the controller and the one or more associated S/As each include a downlink-centric portion and an uplink-centric portion.

16. The method of claim 15, wherein the downlink-centric portion includes a first set of semi-statically configured transmissions from the controller to the one or more associated S/As, wherein a transmission from the controller to each of the one or more associated S/As uses different frequency resources.

17. The method of claim 16, wherein the downlink-centric portion further includes at least one acknowledgement/negative acknowledgement (ACK/NACK) symbol, wherein the controller receives an ACK or a NACK from each of the one or more associated S/As during the at least one ACK/NACK symbol.

18. The method of claim 16, wherein further comprising:
    transmitting, in response to receiving at least one NACK in the at least one ACK/NACK symbol, a PDCCH including scheduling information for retransmission for each of the one or more associated S/As that transmitted a NACK.

19. A controller, comprising:
memory circuitry; and
processor circuitry, the memory circuitry and the processor circuitry configured to:
receive configuration information for interrupt resources from a base station, the interrupt resources including time resources included in a time interval for communications between the controller and one or more associated Sensor/Actuators (S/As); and
process interrupt information received using the interrupt resources to determine a switch time, wherein the switch time is a time to switch from communications between the controller and the one or more S/As to communications between the controller and the base station,
wherein the interrupt information includes priority information associated with information to be sent by the base station, the priority information indicating a priority for switching from communications between the controller and the one or more S/As to communications between the controller and the base station.

20. The controller of claim 19, wherein the memory circuitry and processor circuitry are further configured to:
process the interrupt information to determine the priority information; and
determine whether to switch to communications between the controller and the base station at the switch time or to continue communicating with the one or more associated S/As.

21. The controller of claim 20, wherein the memory circuitry and processor circuitry are further configured to process the interrupt information and determine to switch to communications between the controller and the base station at the switch time and to generate an acknowledgment, wherein the controller further comprises:
transceiver circuitry configured to transmit the acknowledgement to the base station.

22. The controller of claim 20, wherein the memory circuitry and processor circuitry are further configured to process the interrupt information and maintain communications between the controller and the base station at the switch time and to generate and negative acknowledgement, wherein the controller further comprises:
transceiver circuitry to transmit the negative acknowledgement (NACK) to the base station.

23. The controller of claim 19, wherein the memory circuitry and processor circuitry are further configured to process interrupt information to determine an offset, the offset indicating a wait time before the switch time.

24. The controller of claim 19, wherein the memory circuitry and processor circuitry are further configured to receive an indication of one or more physical downlink control channel (PDCCH) monitoring occasions from the base station, receive physical uplink control channel (PUCCH) signaling from the base station, or receive physical uplink shared channel (PUSCH) signaling from the base station.

25. The controller of claim 19, wherein the memory circuitry and processor circuitry are further configured to receive broadcast signaling including at least some configuration for interrupt resources from the base station.

26. The controller of claim 19, wherein in an absence of interrupt information from the base station indicating a switch time, the memory circuitry and processor circuitry are further configured to switch between communications with the base station and communications with the one or more S/As using a semi-static split.

27. An apparatus for wireless communication, comprising:
means for receiving configuration information for interrupt resources from a base station, the interrupt resources including time resources included in a time interval for communications between a controller and one or more associated Sensor/Actuators (S/As); and
means for processing interrupt information received using the interrupt resources to determine a switch time, wherein the switch time is a time to switch from communications between the controller and the one or more S/As to communications between the controller and the base station,
wherein the interrupt information includes priority information associated with information to be sent by the base station, the priority information indicating a priority for switching from communications between the controller and the one or more S/As to communications between the controller and the base station.

28. A non-transitory computer-readable medium storing code for wireless communication, the code comprising instructions executable by a processor to:
receive configuration information for interrupt resources from a base station, the interrupt resources including time resources included in a time interval for communications between a controller and one or more associated Sensor/Actuators (S/As); and
process interrupt information received using the interrupt resources to determine a switch time, wherein the switch time is a time to switch from communications between the controller and the one or more S/As to communications between the controller and the base station,
wherein the interrupt information includes priority information associated with information to be sent by the base station, the priority information indicating a priority for switching from communications between the controller and the one or more S/As to communications between the controller and the base station.

* * * * *